UNITED STATES PATENT OFFICE.

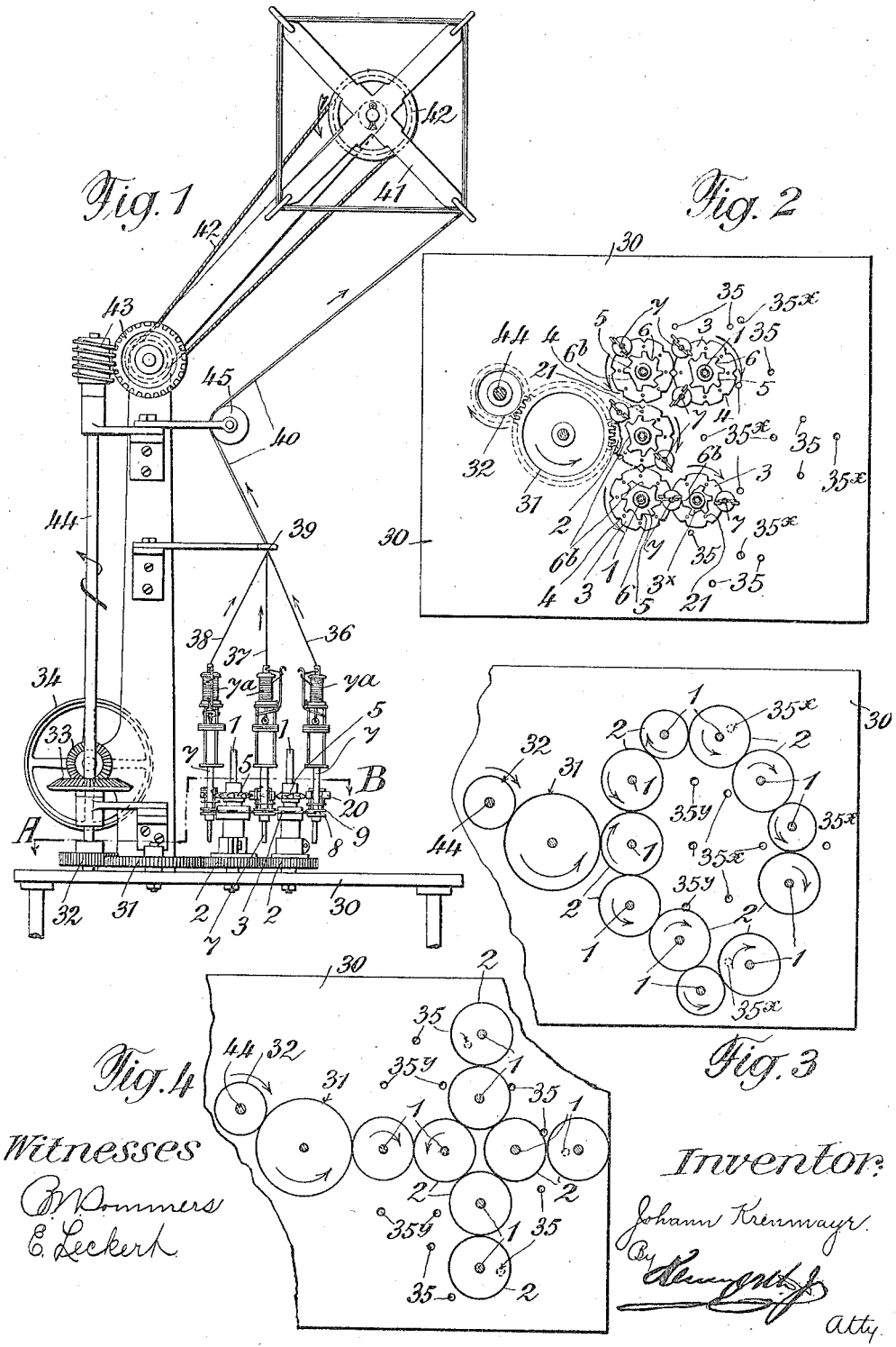

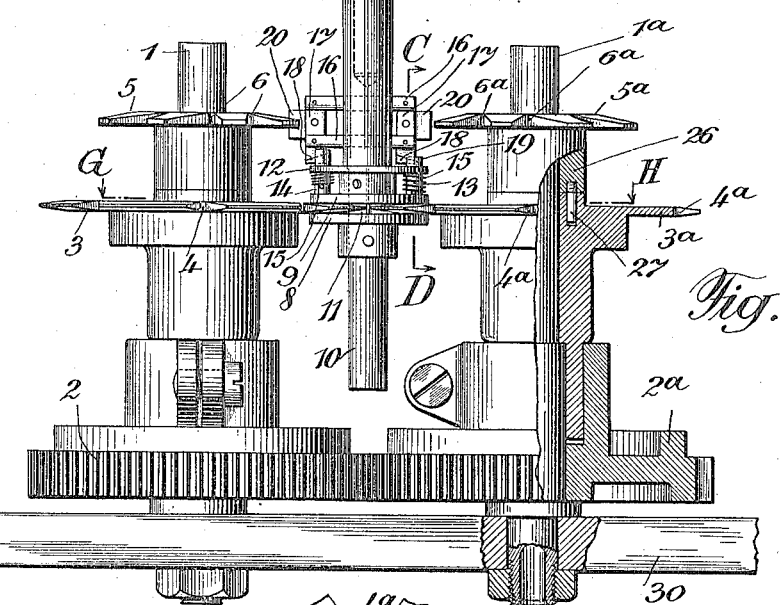

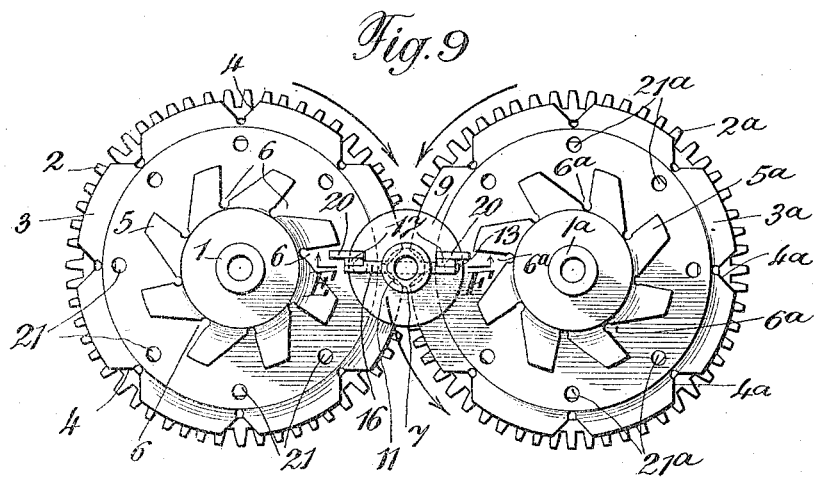
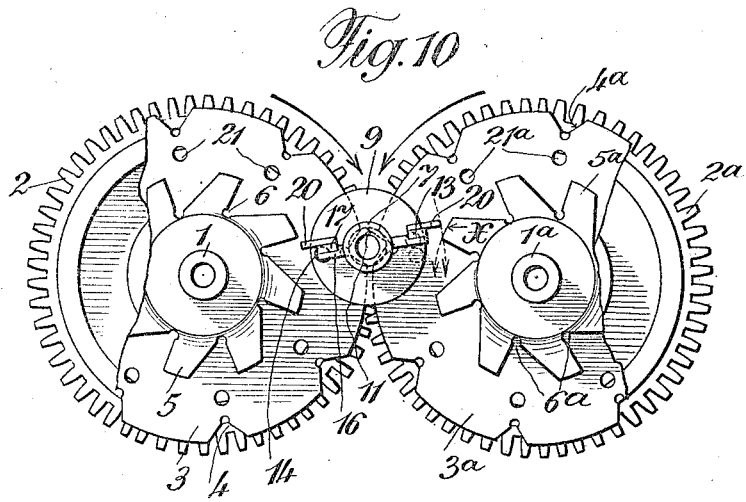

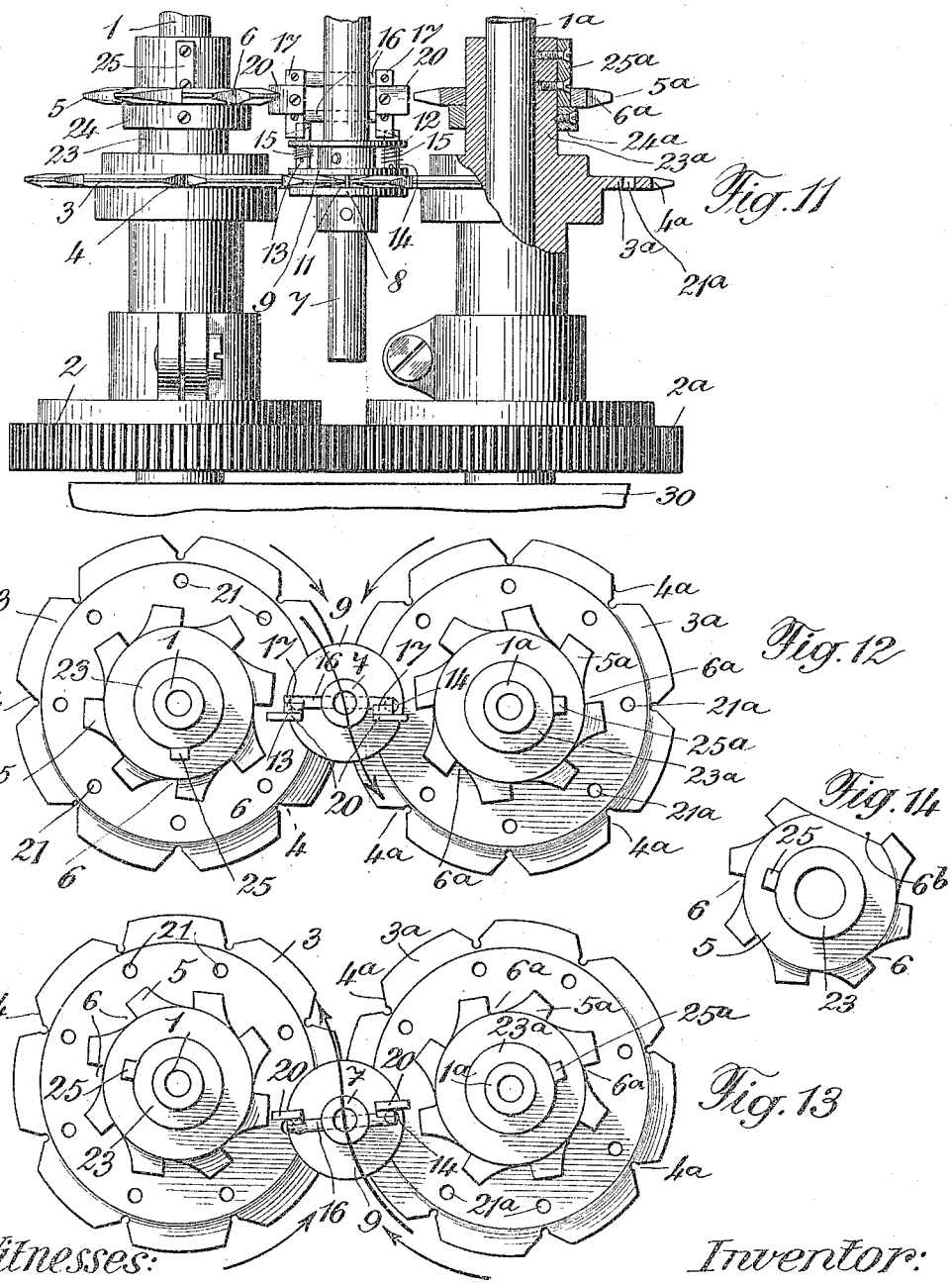

JOHANN KRENMAYR, OF RORSCHACHERBERG, SWITZERLAND, ASSIGNOR TO THE FIRM OF HENRY LEVY, OF RORSCHACH, SWITZERLAND.

PLAITING AND BOBBIN MACHINE.

1,196,463.          Specification of Letters Patent.    Patented Aug. 29, 1916.

Application filed June 29, 1914. Serial No. 847,869.

*To all whom it may concern:*

Be it known that I, JOHANN KRENMAYR, a subject of the Emperor of Austria-Hungary, residing at Sulzstrasse, Rorschacherberg, Switzerland, have invented new and useful Improvements in Plaiting and Bobbin Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to braiding machines, in which flat strips of yarn, straw or the like are braided, and to that type of such machines in which there are provided a plurality of vertical spindles mounted on a plate or bed and having perforated rotating disks. Coöperating with these disks are carriers for the material to be braided. These carriers are provided with coupling means having pins designed to enter the perforations of first one disk and then another, whereby said carriers are caused to wander or travel in sinuous paths. My invention is an improvement on this type of braiding machine, whereby certain disadvantages are done away with. One disadvantage of this type of machine as heretofore constructed has been that a pull exerted on yarn or the like of a carrier at the moment it is being uncoupled from one spindle disk and being coupled to another, causes a rotation of the carrier and prevents the coupling thereof to the disk intended. In order to obviate this disadvantage my invention includes mechanism comprising a sliding element moved horizontally by means of toothed cam disks acting on lugs 180° apart carried by said element. These lugs are arranged to one side of a plane passing through the axes of a pair of spindles and the axis of a carrier coöperating therewith. The carrier has an angular portion coöperating with peripheral notches in opposed spindle disks, whereby the carrier is prevented from rotating at the coupling period. The actuating cams for the coupling are distributed over 360° so as to form a sort of cam wheel. This gives the novel advantage that the spindle arrangement may be changed without having to change the cams to produce a new pattern. These cam wheels are preferably, but not necessarily, reversible. When reversible the path of movement of the carrier may be in a reverse direction. A further improvement is attained by a non-uniform distribution of the cams, on the order of a mutilated gear wheel, thereby causing the clutch to remain unactuated at periods, and thus preventing the transfer of a carrier from one spindle to another at certain periods, enabling a further alteration in the design of the braid.

Other features of invention will hereinafter be more particularly described and pointed out in the claims.

A convenient mode of carrying the invention into effect is shown by way of example in the accompanying drawings forming a part of this specification.

In these drawings Figure 1 is a front elevation of the plaiting machine, a large number of spindles and carriers being omitted; Fig. 2 is a section on the line A—B of Fig. 1; Figs. 3 and 4 show in a diagrammatic manner how the spindles have to be arranged in order to obtain a determinate plaiting pattern; Fig. 5 shows a side view of two spindles and a carrier; Fig. 6 shows a section on the line C—D of Fig. 5; Fig. 7 shows a section on the line E—F of Fig. 9; Fig. 8 shows a section on the line G—H of Fig. 5; Fig. 9 shows a top view of Fig. 5, certain parts being omitted; Fig. 10 shows a top view corresponding to Fig. 9, the different parts being illustrated in another position; Fig. 11 shows a side view of two spindles and a carrier of a modified construction; Fig. 12 shows a top view of Fig. 11; Fig. 13 shows a top view of Fig. 11 after the turning around of the reversing disk, and Fig. 14 shows a modified construction of the reversing disk.

In the construction as illustrated in Fig. 3, 30 denotes a base-plate to which there are fixed by means of screws a plurality of stationary spindles 1. The toothed wheels 2 working into each other are mounted so as to be capable of being turned on said spindles 1. The toothed wheels 31 and 32 and the bevel wheels 33 transmit the motion of the pulley 34 to said toothed wheels 2. As shown in Figs. 2, 3 and 4, a large number of such spindles 1 are detachably secured to the base-plate 30 and the latter has a large number of holes 35, $35^x$, $35^y$ forming in relation to one another several geometrical figures of various shape, so that the spindles to be secured to said plate 30 may also form determinate figures. For the sake of simplicity I shall refer in the following description as a rule to only two spindles and a carrier.

Drivers 3 and $3^a$ are rigidly connected to the toothed wheels 2 and $2^a$. These drivers have on their circumference rectangular notches 4 and $4^a$ which, when meeting in the middle between the two drivers, supplement one another to a square-hole (Fig. 8). To the drivers 3 and $3^a$ there are rigidly connected cam wheels or reversing-disks 5 and $5^a$ provided on their circumference with acute-angled notches 6 and $6^a$ (Figs. 9 and 10). For the purpose of connecting the reversing-disks 5, $5^a$ in a rigid manner to said drivers 3 and $3^a$, the disks 5, $5^a$ have hubs or sleeves 26 provided with one or more pins 27 projecting into corresponding holes of the drivers 3, $3^a$. It will be seen, that the reversing-disks may be easily detached and interchanged.

7 denotes the carrier carrying at its upper end the bobbin $7^a$ upon which the yarn, strip of straw or the like is wound. The shaft 10 of the carrier is squared at 11 (Figs. 7 and 8) said squared portion being arranged between two collars 8 and 9 (Figs. 6 and 7), the size of said portion 11 corresponding to that of the square-hole formed by two notches 4 and $4^a$. The carrier 7 rests on the rim of a driver projecting into the space provided between the collars 8 and 9; the square piece 11 projects thereby into one of the notches 4 or $4^a$. Two vertical pins 13 and 14 acting as coupling members are adjustably arranged in the upper collar 9 and a collar 12 disposed above the latter. Springs 15 endeavor to move these pins downward. The carrier 7 carries a clutch-mechanism capable of being shifted in a horizontal direction. This mechanism (Figs. 5 and 7) has two horizontal rods 16 carrying at their ends vertical plates 17. These vertical plates 17 are provided at their lower side with hooks 18 having beveled lower edges loosely engaging from below correspondingly shaped noses 19 of the pins 13 and 14. Upon a displacement of this clutch-mechanism one of said pins will be lifted, while the other is simultaneously lowered. The hooks 18 have such an amount of play, that the operative connection between the pins 13 and 14 and the clutch-mechanism will not be a rigid one, but a loose one and, owing to the provision of the springs, also an elastic one. To the plates 17 there are fixed lugs 20, which, as will be particularly seen from Figs. 9 and 10, are fixed to one side of the clutch-mechanism, said lugs being arranged on the same side of the vertical plane passing through the axes of the spindles 1 and $1^a$ and the carrier 7. On the other side of said plane no such lugs are provided. The drivers 3 and $3^a$ have moreover locking holes 21, $21^a$, which may be engaged by the pins 13 or 14.

The hereinbefore described locking mechanism for the carriers works as follows: Let us assume that the carrier rests on the rim of the driver 3 and that the drivers 3 and $3^a$ rotate in the direction of the arrows shown in Fig. 9. The carrier shall now wander from the driver 3 over to the driver $3^a$. Before the carrier comes to lie between the spindles 1 and $1^a$, that is to say when the carrier is in the position shown in Fig. 10, a notch of the driver $3^a$ engages the square piece 11, so that the latter will, for the time being, be prevented from rotating (see Fig. 8). When a carrier has to be conveyed from one driver over to another one, it cannot be prevented in the hitherto known machines from resting during a very short time-interval neither on the one nor on the other of said drivers. It may, however, occur, that the carrier is just rotated accidentally during this time-interval, for instance owing to a pull of the thread, so that the carrier is prevented from wandering farther. Now, as I have hereinbefore mentioned, in the machine according to this invention the carrier is already secured against rotation before it passes from one driver over to another one. Upon the further rotation of the two drivers 3 and $3^a$ the rim part $x$ (Fig. 10) of the reversing disk $5^a$ strikes against the lug 20, thus pushing the locking-mechanism 16, 17 toward the driver 3, with the result, that one of the pins is pulled out of the hole 21 of the driver 3, while the other pin is pushed into the hole $21^a$ of the driver $3^a$. The carrier is thus locked to the plate $3^a$. In the mean time the other lug 20 engages a notch 6 of the reversing-disk 5. Owing to the fact that the reversing disks 5 and $5^a$ are rigidly connected to the drivers 3 and $3^a$, the notches 6 and $6^a$ remain permanently in a definite position with regard to the notches 4 and $4^a$. This is very advantageous in case the spindles have to be placed differently. The arrangement of spindles 1 shown in Fig. 3 corresponds, for instance, to a definite plaiting-pattern and in this case no spindles are put in the holes $35^x$ and $35^y$. Now, it may occur, that another plaiting-pattern has to be produced, so that all spindles 1 have to be taken out, there having to be put only a certain number of them in the holes $35^x$ (Fig. 4). In such a case it has been necessary to adjust accordingly in the hitherto proposed machines the parts actuating the clutch, since the smallest displacement of one of the drivers, prevents the actuation of the coupling-mechanism at the right moment. Such an adjustment has not to be carried out in the machine according to the present invention, because the reversing-disks 5, 5ª do not change their position relatively to the drivers 3, 3ª when the spindles are placed differently.

The threads 36, 37, 38 (Fig. 1), which have to be plaited pass through an ear like guide 39, in which they are plaited, and the plaited band or strip is wound upon a reel 41. A belt 42 and a worm gearing 43 transmit the motion of the shaft 44 to said reel 41, while the shaft 44 receives its drive from the pulley 34 by means of the bevel-wheels 33.

In carrying the invention into effect as shown in Figs. 11, 12 and 13 the sleeves 23 and 23ª are rigidly connected to the drivers 3 and 3ª. To these sleeves there are screwed collars 24, 24ª. On the latter are loosely mounted the reversing disks 5, 5ª. Keys 25, 25ª fixed to the sleeves 23 and 23ª respectively, engage a corresponding groove of the reversing disks 5 and 5ª respectively. The reversing-disks have, therefore, permanently a definite position with regard to the drivers 3, 3ª. The reversing-disks 5, 5ª may be easily stripped off from the spindles and after they have been turned around they may be again put on said spindles. From Figs. 12 and 13 it can be seen that this arrangement permits also a rotation of the carrier 7 in the opposite direction. In Fig. 14 I have shown how, owing to the omission of a tooth, there may be provided a large notch 6ᵇ having the size of two ordinary notches. This allows of the following advantage: Upon a carrier engaging the notch 6ᵇ, the coupling mechanism will not be actuated and the carrier instead of being moved forward is returned toward the one or the other end of the machine where it may be shifted by means of small wheels 3ˣ (shown in Fig. 2, where the use of wheels of the type illustrated in Fig. 14 is also shown) to an amount corresponding to the distance between one or more locking holes 21, 21ª. When this carrier comes again within reach of the reversing disk provided with a notch 6ᵇ it will not engage the notch 6ᵇ, but it will enter with one side of the coupling mcehanism in a notch 6, one of the teeth acting this time upon the coupling mechanism, so that the carrier will be moved farther along the machine. Other carriers are also fed at fixed time-intervals in the same manner as has just been described through the machine. Empty spaces are thus produced at certain distances in the plaiting patterns, said spaces corresponding to the empty spaces left out, for instance in laces. Hitherto it was only possible to produce such patterns on machines which were not suitable for manufacturing simultaneously closed and open patterns.

I claim—

1. In a braiding machine, the combination with stationary spindles mounted in a suitable base, drivers rotatable on said spindles having coupling perforations and notched peripheries; of carriers arranged to be held against rotation in opposed notches of adjacent drivers, cam disks movable in unison with said drivers, a coupling on each carrier including a pair of vertically movable coupling pins and a sliding element actuated by said cam disks to control the alternate movement of said pins, lugs on the ends of said sliding member for engagement by said cam disks and arranged to one side of a plane passing the axes of two spindles and their coöperating carrier.

2. In a braiding machine, the combination with stationary spindles mounted in a suitable base, of drivers rotatably mounted on said spindles and having angular recesses in their peripheries and coupling holes adjacent the spindles, means to rotate the drivers, carriers having portions rectangular in cross section arranged to be engaged by opposing recesses in said drivers, cam disks movable in unison with said drivers, a coupling mechanism on each spindle comprising a horizontally slidable member, a pair of pins vertically movable alternately out of the coupling holes by said member, lugs on the latter arranged 180° apart for engagement by said cam disks and arranged to one side of a plane passing the axes of two spindles and their coöperating carrier.

3. In a braiding machine, the combination of stationary spindles mounted on a suitable base, drivers rotatable on the spindles, means for rotating the spindles, spool carriers each having a pair of pins for coupling the carriers to the drivers, a horizontally sliding actuator for said pairs of pins and disks rigidly connected with the drivers, having a plurality of actuating teeth for horizontally sliding said actuator.

4. In a braiding machine, a plurality of spindles mounted on a suitable base, drivers rotatable on said spindles, means for rotating the drivers, spool carriers, a coupling mechanism for connecting the carriers to the drivers, a horizontally slidable controller therefor, and a plurality of teeth distributed over the circumference of each spindle for horizontally moving the coupling mechanism.

5. In a braiding machine, a plurality of spindles mounted on a suitable base, drivers rotatable on said spindles, means for rotating the drivers, spool carriers, a coupling mechanism for connecting the carriers to the drivers, a horizontally slidable controller therefor, disks having a plurality of actuating teeth for horizontally sliding the coupling mechanism, said disks being adjustably and reversibly connected to the drivers.

6. In a braiding machine, a base plate, stationary spindles mounted therein, drivers rotatably mounted on the spindles having angular peripheral notches, cam disks connected to said drivers and having a plurality of cam surfaces lying in the same plane, carriers coöperating with said drivers, and a coupling mechanism including a horizontally movable actuator acted upon by said disks.

7. In a braiding machine, a base plate, stationary spindles mounted therein, drivers rotatably mounted on the spindles having angular peripheral notches, reversible cam disks connected to said drivers and having a plurality of cam surfaces lying in the same plane, carriers coöperating with said drivers, and a coupling mechanism including a horizontally movable actuator acted upon by said disks.

8. In a braiding machine, a base plate, stationary spindles mounted therein, drivers rotatably mounted on the spindles having angular peripheral notches, cam disks connected to said drivers and having a plurality of non-uniformly spaced cam surfaces lying in the same plane, carriers coöperating with said drivers, and a coupling mechanism including a horizontally movable actuator acted upon by said disks.

9. In a braiding machine, a base plate, stationary spindles mounted therein, drivers rotatably mounted on the spindles and having angular peripheral notches, reversible cam disks connected to said drivers and having a plurality of non-uniformly spaced cam surfaces lying in the same plane, carriers coöperating with said drivers, and a coupling mechanism including a horizontally movable actuator acted upon by said disks.

10. In a braiding machine, a base plate, stationary spindles mounted therein, peripherally notched perforated drivers rotatably mounted on the spindles, carriers coöperating with the notched drivers, cam disks coaxially connected to the drivers and having a plurality of peripheral cam surfaces, a coupling on each carrier comprising a pair of alternately vertically movable spring-retracted coupling pins to engage the perforations of the drivers and, a horizontally movable actuator having beveled actuating surfaces for engagement with like surfaces on said pins.

In testimony that I claim the foregoing as my invention, I have signed my name in presence of two subscribing witnesses.

JOHANN KRENMAYR.

Witnesses:
FRANK TIMMKE,
R. H. WILLIAMS.

Copies of this patent may be obtained for five cents each, by addressing the "Commissioner of Patents, Washington, D. C."